Inventor
F. C. Gillitt
By Victor J. Evans
Attorney

Witnesses ature: # UNITED STATES PATENT OFFICE.

FREDERIC C. GILLITT, OF HASTINGS, MINNESOTA.

CORN-POPPING MACHINE.

1,206,693.

Specification of Letters Patent. Patented Nov. 28, 1916.

Application filed January 5, 1915. Serial No. 681.

*To all whom it may concern:*

Be it known that I, FREDERIC C. GILLITT, a citizen of the United States of America, residing at Hastings, in the county of Dakota and State of Minnesota, have invented new and useful Improvements in Corn-Popping Machines, of which the following is a specification.

This invention relates to improvements in corn popping machines and has particular application to an electrically energized corn popper.

In carrying out the present invention, it is my purpose to provide an electrically operated corn popper whereby the corn will be popped and the popped corn blown out of the popper into a receptacle whence it may be delivered to bags or the like.

It is also my purpose to provide a machine of the class described wherein the popping plate will be revolved during the popping of the corn and the plate and blower operated from a single electric motor and the plate electrically heated so that the corn therein will be popped, the popped corn in the popper being blown out of the latter, incident to the popped corn being lighter in weight than the grains, into a receptacle.

A further object of my invention is to provide a machine of the class described wherein the flow of the grains to the popping plate may be regulated and wherein the component parts will be so correlated and arranged as to reduce the possibility of derangement to a minimum and enable access to be had to the parts with ease and convenience.

With the above and other objects in view, the invention consists in the construction, combination and arrangement of parts hereinafter set forth in and falling within the scope of the claims.

Figure 1:
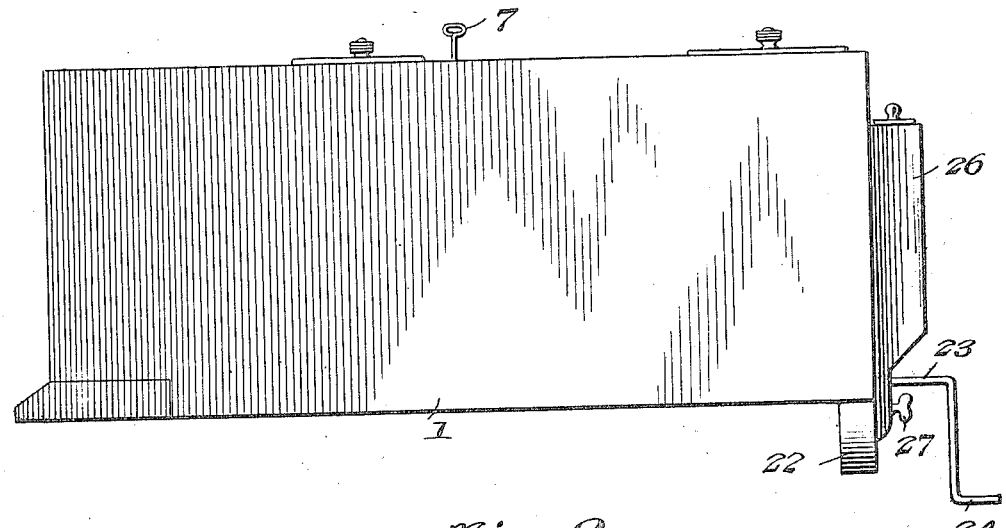
Figure 2:
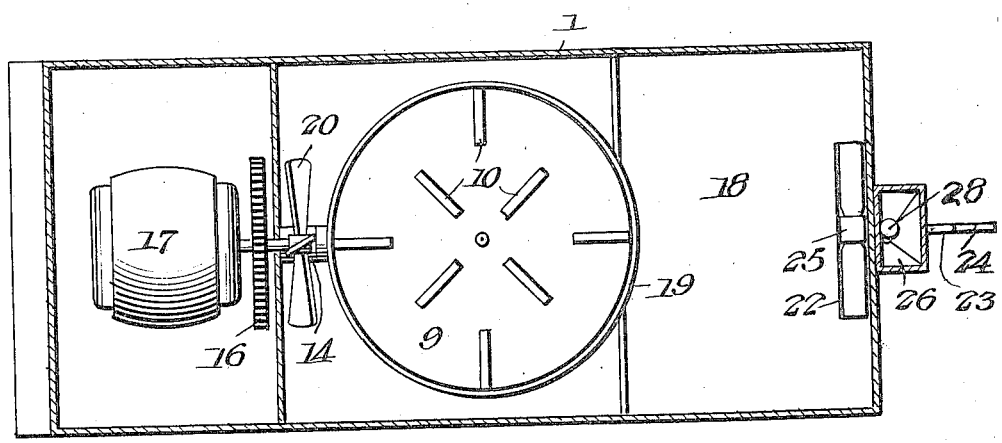
Figure 3:
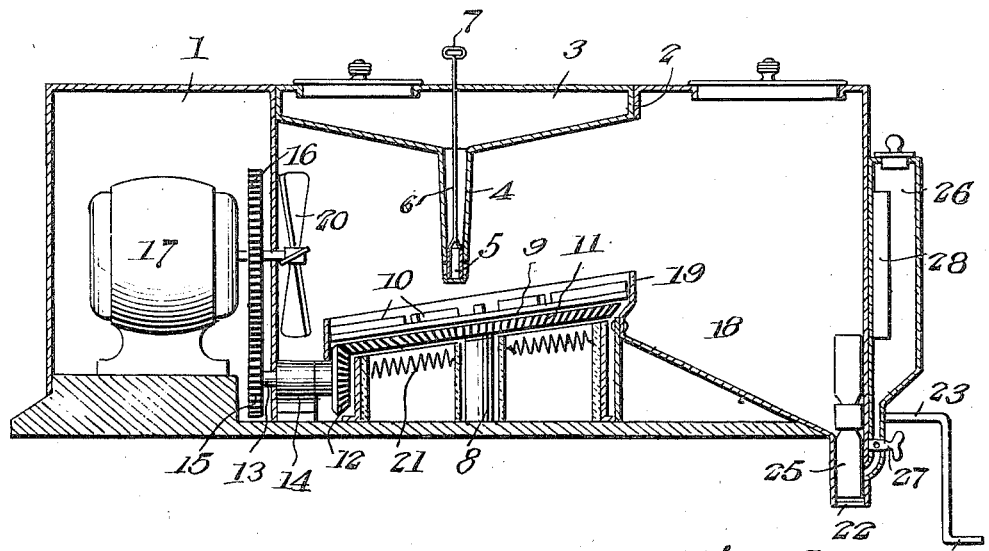
Figure 4:
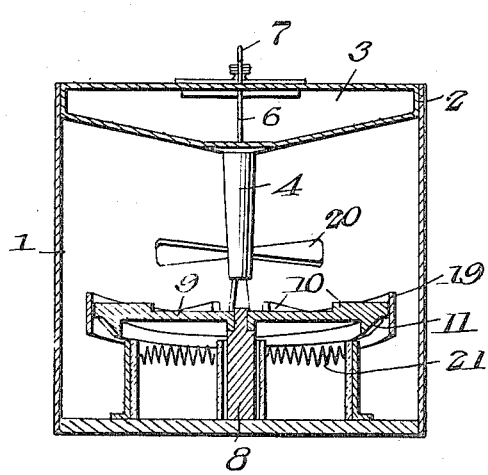
Figure 5:
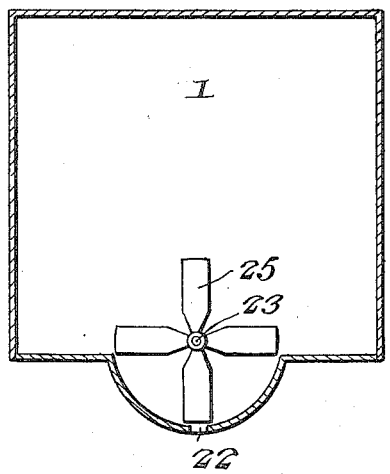

In the acompanying drawings; Figure 1 is a view in side elevation of a corn popping machine constructed in accordance with the present invention. Fig. 2 is a horizontal sectional view therethrough. Fig. 3 is a longitudinal vertical sectional view through the machine. Fig. 4 is a vertical cross section through the machine. Fig. 5 is a view similar to Fig. 4 taken on a plane parallel to Fig. 4.

Referring now to the drawings in detail, 1 designates a substantially rectangular receptacle having the top wall thereof formed, approximately centrally, with an opening 2. Disposed within the opening 2 and suitably secured to the walls of such opening is a hopper 3 designed to contain the grains of pop corn and provided centrally with a depending spout 4 extending into the casing 1. In the present instance, the lower end of the spout 4 is provided with a controlling valve 5 equipped with an upwardly projecting stem 6 extending through the spout 4 and having the upper extremity thereof provided with a handle 7 whereby the stem may be actuated to move the valve 5 to open and closed positions and to intermediate positions to regulate the quantity of grains discharged from the hopper.

Suitably fastened to the bottom wall of the casing 1 and projecting upwardly therefrom is a post 8 disposed at one side of the vertical center line of the hopper and rotatably mounted upon the upper end of the post 8 concentrically thereof is a circular popping plate or disk 9 having the upper surface thereof provided with upwardly extending ribs 10. This plate or disk 9 is adapted for rotation about the post 8 and is designed to receive the pop corn grains from the hopper 3 through the spout 5 when the valve 5 is opened, the lower end of the spout 4 discharging onto the disk 9. Formed on the under surface of the popping plate 9 on the periphery thereof is an annular row of beveled teeth 11 with which mesh a bevel pinion 12 keyed upon one end of a horizontal shaft 13 journaled in a bearing 14 mounted upon the bottom wall of the casing 1 adjacent to the plate 9. On the remaining end of the shaft 13 is keyed a spur pinion 14 meshing with a similar gear 16 fast upon one end of the armature shaft of an electric motor 17. In the present instance, the plate 9 is inclined downwardly toward the motor 17 and when the motor is energized the plate is revolved about its axis so that the pop corn grains thereon will be agitated and thrown around upon the plate. In the present instance, the motor 17 is located at one end of the casing 1 and at the lower end of the popping disk, and disposed at the opposite end of the casing 1 at the elevated extremity of the popping disk, is a hopper-shaped receptacle 18 having the upper end open and adapted to receive the popped corn from the disk 9, while encircling the marginal edge of the popping disk and secured to the upper end of the receptacle 18 and the bearing 14 is an annular band 19 extending a short distance above the popping disk to form the side of the pan so as to prevent the accidental discharge of the pop corn from the pan. In this instance, a fan or blower 20 is keyed upon the end of the armature shaft beyond the spur gear 16. Disposed below the plate 9 is an electric heating coil 21 adapted, when energized, to heat the disk 9.

In practice, the hopper 3 is supplied with pop corn grains and the valve 5 opened the desired distance through the medium of the stem 6. When the valve 5 is opened the pop corn grains drop onto the popping disk 9. The motor 17 is now energized and through the medium of the spur gear 16, pinion 15, shaft 13, pinion 12 and annular row of beveled teeth 11 on the popping disk, such disk is revolved to agitate the pop corn grains thereon. Previous to the energization of the motor, the heater 21 is energized and so imparts heat to the popping disk and as the latter is rotated and the pop corn grains discharged thereon, such grains are popped and open up. As is well known, the popped corn is much lighter in weight than the grains and as the fan 20 is revolving under the action of the motor, such relatively light corn is blown off of the popping disk and into the receptacle 18.

The receptacle 18 is provided with a discharge opening 22 disposed adjacent to the proximate end wall of the casing 1 and journaled in the end wall of the casing above the opening 22 is a shaft 23 having the outer end thereof provided with a crank handle 24 whereby the shaft may be rotated. Fixed to the inner end of the shaft 23 and radiating therefrom and spaced apart equal distances are cut-off blades 25, each having the outer end thereof corresponding in thickness to the width of the discharge opening 22 and movable over the opening to obstruct the flow of pop corn therethrough.

In the embodiment of my invention selected for illustrative purposes, a butter container 26 is secured to the end wall of the casing 1 above the discharge spout 22 and the lower end of the butter container opens into the receptacle 18 immediately above the discharge opening 22 so that the butter therein may be discharged onto the pop corn passing out through the opening 22. Controlling the outlet end of the container 26 is a valve 27 and located within the container is an electrically energized heater 28 whereby the butter within the container will be maintained in a liquid condition.

When it is desired to obtain a quantity of popped corn from the receptacle 18, the shaft 23 is rotated through one quarter of a revolution under the action of the handle 24 and in this movement the discharge opening is blade covering the discharge opening and the following blade carried toward the opening and over the latter. Thus, a predetermined quantity of popped corn will be discharged through the opening 22 in the rotation of the shaft 23 and blades 25, the blades 25, shaft 23 and handle 24 constituting, in effect, a measuring valve. It is conceivable that the construction of the measuring valve may be changed or varied. When the measuring valve is thus operated to effect the discharge of a quantity of popped corn from the receptacle 18, the valve 27 is opened to the desired degree so that a quantity of butter will be delivered to the popped corn passing out through the opening 22.

From the foregoing description taken in connection with the accompanying drawings, the construction and mode of operation of my improved corn popping machine will be readily apparent.

It will be seen that I have provided a corn popping machine whereby the pop corn grains may be popped and subsequently removed from the popping plate and delivered to the storage receptacle from which they may be drawn in predetermined quantities when desired and whereby the popped corn when drawn from the receptacle will be supplied with a quantity of butter or analogous material.

While I have herein shown and described the preferred form of my invention by way of illustration, I wish it to be understood that I do not limit or confine myself to the precise details of construction herein described and delineated, as modification and variation may be made within the scope of the claims without departing from the spirit of the invention.

I claim:

1. In a corn popping machine, a circular popping plate disposed at an angle to the horizontal and rotatable about a vertical axis, a stationary annular band surrounding the plate and extending thereabove, means for feeding the pop corn grains to said plate, a heater for said plate, and means for rotating said plate.

2. In a corn popping machine, a circular popping plate disposed at an angle to the horizontal and rotatable about a vertical axis, upwardly extending ribs upon said plate, means for feeding the pop corn grains to said plate, a heater for said plate, means for rotating said plate, means for blowing air in a horizontal plane across said plate to blow the popped corn from the plate, and a receptacle adapted to receive the corn blown from said plate.

In testimony whereof I affix my signature in presence of two witnesses.

FREDERIC C. GILLITT.

Witnesses:
W. H. GILLITT,
MARTHA SIEBEN.